(12) United States Patent
Vendrand

(10) Patent No.: US 12,311,995 B2
(45) Date of Patent: May 27, 2025

(54) VEHICLE STEERING WHEEL WITH AN ELECTRICAL DEVICE

(71) Applicant: Autoliv Development AB, Vargarda (SE)

(72) Inventor: Victorien Vendrand, Chiré-en-Montreuil (FR)

(73) Assignee: Autoliv Development AB, Vårgårda (SE)

( * ) Notice: Subject to any disclaimer, the term of this patent is extended or adjusted under 35 U.S.C. 154(b) by 47 days.

(21) Appl. No.: 18/160,350

(22) Filed: Jan. 27, 2023

(65) Prior Publication Data

US 2023/0242172 A1 Aug. 3, 2023

(30) Foreign Application Priority Data

Jan. 31, 2022 (FR) ........................................ 2200846

(51) Int. Cl.
*B62D 1/06* (2006.01)
*B62D 1/04* (2006.01)
*H05B 3/34* (2006.01)

(52) U.S. Cl.
CPC ............. *B62D 1/065* (2013.01); *B62D 1/046* (2013.01); *H05B 3/34* (2013.01)

(58) Field of Classification Search
CPC .......... B62D 1/046; B62D 1/06; B62D 1/065; H05B 3/34; Y10T 74/2087
See application file for complete search history.

(56) References Cited

U.S. PATENT DOCUMENTS

| | | | | |
|---|---|---|---|---|
| 4,547,655 A | * | 10/1985 | Kurata | B62D 1/065 219/535 |
| 6,414,270 B1 | * | 7/2002 | Sugiyama | B62D 1/065 74/552 |
| 7,019,261 B2 | * | 3/2006 | Worrell | H05B 3/48 219/544 |
| 8,946,598 B2 | | 2/2015 | Hasegawa | |
| 10,045,401 B2 | * | 8/2018 | Wada | H05B 3/36 |
| 10,597,060 B2 | | 3/2020 | Morita | |
| 11,390,312 B2 | * | 7/2022 | Hotta | C09D 11/52 |
| 11,482,999 B2 | * | 10/2022 | Takahara | G01D 5/24 |

(Continued)

FOREIGN PATENT DOCUMENTS

| | | | | |
|---|---|---|---|---|
| EP | 2894076 A1 | * | 7/2015 | ............ B62D 1/065 |
| JP | 2016165940 A | * | 9/2016 | |
| KR | 20210131333 A | * | 11/2021 | |

OTHER PUBLICATIONS

Machine translation of KR 20210131333 A obtained on May 9, 2024.*

*Primary Examiner* — Adam D Rogers
(74) *Attorney, Agent, or Firm* — Matthew D. Thayne; Thayne and Davis LLC

(57) ABSTRACT

The invention relates to a vehicle steering wheel having a hub arranged to be connected to a steering element of the vehicle, at least one branch attached to the hub, a rim attached to said at least one branch, and further having: a core defined by a frame portion and by an overmolding material at least partially overmolded on the frame portion, an electrical device covering at least part of the core and comprising a substrate supporting at least one electrical conductor arranged facing the core, characterized in that the steering wheel comprises an insulating film electrically arranged between the electrical conductor and the core.

20 Claims, 3 Drawing Sheets

(56) References Cited

U.S. PATENT DOCUMENTS

| | | | |
|---|---|---|---|
| 2011/0073582 A1* | 3/2011 | Morita | B62D 1/065 |
| | | | 219/204 |
| 2011/0233183 A1 | 9/2011 | Saunders et al. | |
| 2017/0254675 A1* | 9/2017 | Hein | G01L 1/142 |
| 2021/0362767 A1 | 11/2021 | Minoshima et al. | |
| 2022/0212711 A1 | 7/2022 | Zhang et al. | |

* cited by examiner

[Fig. 1]
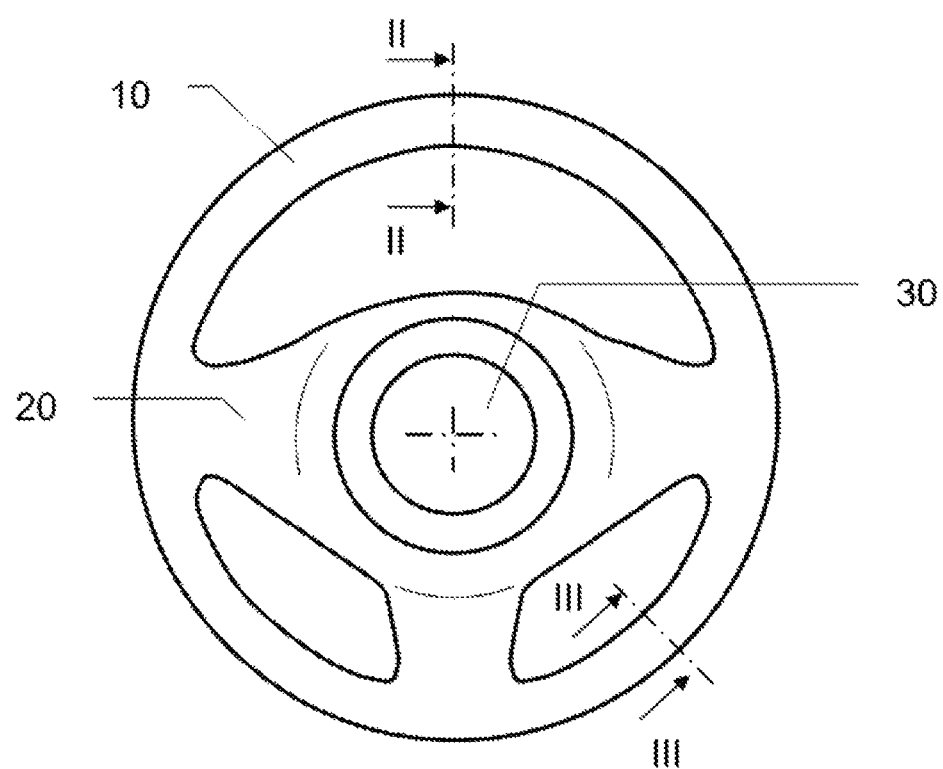

[Fig. 2]
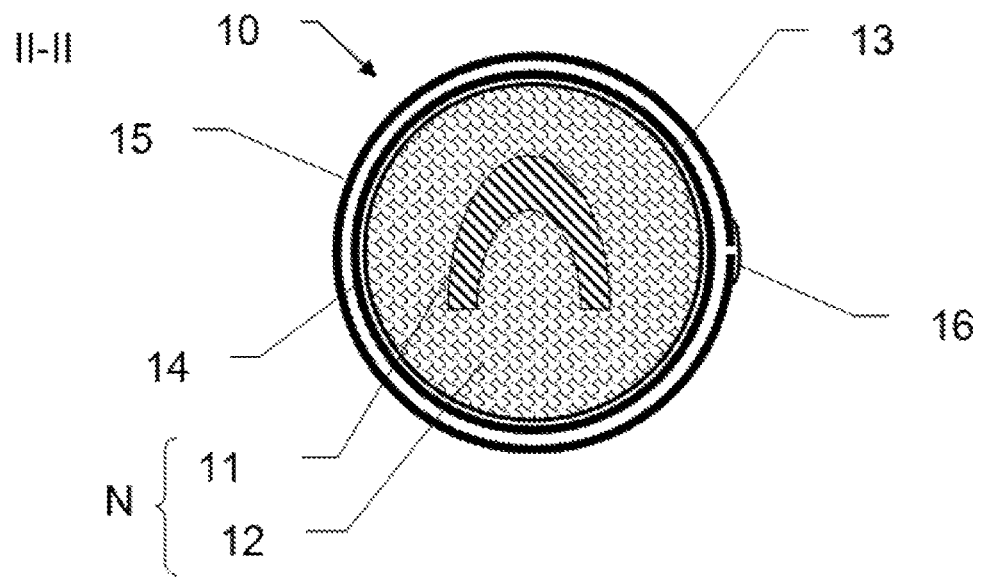
[Fig. 3]
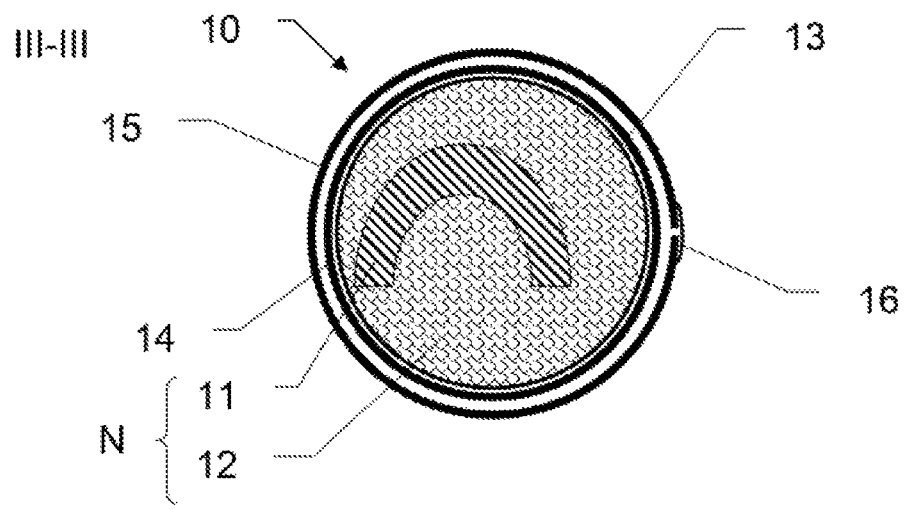

[Fig. 4]
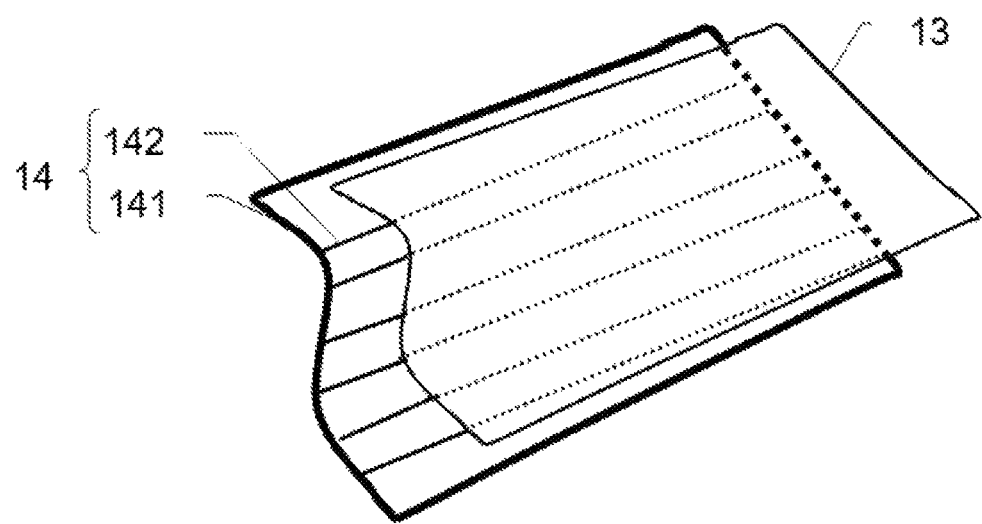

VEHICLE STEERING WHEEL WITH AN ELECTRICAL DEVICE

CROSS-REFERENCE TO RELATED APPLICATIONS

This application claims priority pursuant to 35 U.S.C. 119(a) to French Application No. 2200846, filed Jan. 31, 2022, which application is incorporated herein by reference in its entirety.

TECHNICAL FIELD OF THE INVENTION

The present invention relates in general to vehicle steering wheels, and in particular vehicle steering wheels equipped with an electrical device (such as a device for heating or detecting contact or proximity with the user), in particular at the rim.

STATE OF THE ART

In the prior art, vehicle steering wheels equipped with an electrical device (such as a device for heating or detecting contact or proximity with the user), in particular at the rim, it is known to position the electrical device on a core of the rim. The core typically consists of a frame overmolded with an overmolding material. The electrical device in turn comprises an electrical conductor carried by a flexible substrate. Depending on the proximity of the frame to the electrical device, it may happen that the frame disrupts the operation of the electrical device; short circuits or interference measurement perturbations may occur if the frame is close to or touches the electrical conductor.

DISCLOSURE OF THE INVENTION

An object of the present invention is to overcome the shortcomings of the background art mentioned above and in particular, firstly, to propose a vehicle steering wheel provided with an electrical device whose functioning is not disrupted, even if the frame is close to the electrical device.

A first aspect of the invention therefore relates to a vehicle steering wheel comprising:
  a hub arranged to be connected to a steering element of the vehicle,
  at least one branch attached to the hub,
  a rim attached to said at least one branch, and comprising:
    a core defined by a frame portion and by an overmolding material at least partially overmolded on the frame portion,
    an electrical device covering at least part of the core and comprising a substrate supporting at least one electrical conductor arranged facing the core, characterized in that the steering wheel comprises an insulating film electrically arranged between the electrical conductor and the core.

The insulating film located between the electrical device and the core makes it possible to guarantee perfect electrical insulation and a minimum distance between the electrical conductor and the core of the core, even if the overmolding material is absent and/or has a small thickness, local discontinuities, or perforations. It may be noted that the electrical conductor arranged facing the core may be partly or totally at the external surface of the substrate, on the side of the core, and without an insulating sheath (in other words the conductive material of the electrical conductor is bare). The electrical conductor can be partially embedded in the substrate, it can pass through it at once or repeatedly to go from one face to the other. In any case, the electrical conductor may be flush and/or external to the substrate, so that contact or proximity with the frame without the insulating film could cause a malfunction (short circuit or measurement disturbance), and such a malfunction is avoided thanks to the insulating film arranged between the electrical conductor and the core.

According to one embodiment, the electrical device may comprise a single substrate supporting said at least one electrical conductor.

According to one embodiment, the substrate can position said at least one electrical conductor in the electrical device.

According to one embodiment, the electrically insulating film can cover a first layer of overmolding material at least partially overmolded on the frame portion. According to this embodiment, a second layer of overmolding material may be provided at least partially overmolded on the portion of the frame and/or on the insulating film of electricity and/or on the electrical device. According to this embodiment, the second layer of overmolding material may be overmolded after the assembly of the electrically insulating film and/or the electrical device on the steering wheel. An electrically insulating film is naturally thin (with a thickness of less than 0.2 mm, between 0.01 mm and 0.05 mm) and makes it possible to propose two distinct layers of overmolding material, without however imposing a large diameter of the rim.

According to one embodiment, the electrically insulating film can form an independent component as such. In other words, the electrically insulating film can be an envelope or a barrier or else a film separating the electrical conductor from the core, formed by an independent sheet (before assembly on the core). In particular, the electrically insulating film may form a component free of adhesive layer. In particular, the insulating film is not a layer of glue spread on the core and/or on the electrical device (or inside the electrical device).

According to one embodiment, the electrically insulating film can be arranged directly on the overmolding material at least partially overmolded on the frame portion. According to this embodiment, the electrically insulating film can be bonded or attached directly onto the overmolding material at least partially overmolded on the frame portion.

According to one embodiment, the electrically insulating film can be distinct from the substrate of the electrical device.

According to one embodiment, a distance separating an external surface of the electrical device and/or the electrical conductor is less than a distance separating the core of the electrical device and/or the electrical conductor, for at least 50% of the surface of the electrical device, and preferably for at least 70% of the surface of the electrical device. In other words, the electrical device is arranged in the external part of the rim instead.

According to one embodiment, the substrate is not a film. According to one embodiment, the substrate is a porous support and/or having through openings (such as openings between threads of a woven or nonwoven textile, openings of an open-cell foam). Such openings cannot prevent contact between the electrical conductor and the core, so that the electrically insulating film guarantees good electrical insulation.

According to one embodiment, the substrate may be a woven textile, a nonwoven textile (of tangled fibers), a foam with open cells, or a pierced or porous sheet. According to one embodiment, the substrate can be made of plastic (polyvinyl chloride (PVC), polyamide, polyurethane, polyether, polyester, polyethylene, thermoplastic polyurethane (TPU), elastomer such as ethylene-propylene-diene monomer (EPDM), polypropylene, etc.), of inorganic material (glass fibers, etc.) or a mixture of these materials.

According to one embodiment, the electrical conductor (for example a heating element) can be sewn onto the substrate. In particular, the electrical conductor can be attached on the substrate by a wire passing through the substrate. Such an attachment at least partially perforates the substrate, which can generate portions without electrical insulation, and the insulating film, affixed after the seam (or after the attachment of the electrical conductor on the substrate), is free of perforations and/or through-holes.

According to one embodiment, the insulating film may be present between the electrical device and the core only at the locations where the electrical conductor is facing the core. If the electrical conductor is not present on the entire surface of the electrical device covering the core, it is for example possible to provide the insulating film only on the "active" surface where the electrical conductor is present or flush. It may be provided to cover this "active" surface by going a few millimeters past it, for example.

According to one embodiment, the insulating film has a thickness of less than 200 μm, preferentially between 10 μm and 100 μm, ideally between 10 μm and 50 μm. The insulating film may be provided sufficiently supple and/or flexible to adapt to the complex shapes of the rim, in order to be able to be deposited or sheathed on the rim without forming folds visible to the user of the vehicle steering wheel.

According to one embodiment, the insulating film can be formed of polyethylene (PE), or of polyurethane (PU), or of ethylene-propylene-diene monomer (EPDM), or of poly (vinyl chloride) (PVC), or of thermoplastic polyurethane (TPU). The insulating film may be provided sufficiently supple and/or flexible to adapt to the complex shapes of the rim, in order to be able to be deposited or sheathed on the rim without forming folds visible to the user of the vehicle steering wheel.

According to one embodiment, the film comprising a polymer may comprise polyethylene PE, and/or polyurethane PU, and/or ethylene-propylene-diene monomer EPDM monomer, and/or polyvinyl chloride PVC, and/or thermoplastic polyurethane TPU. The film comprising a polymer may be provided sufficiently supple and/or flexible to adapt to the complex shapes of the rim, in order to be able to be deposited or sheathed on the rim without forming folds visible to the user of the vehicle steering wheel.

According to one embodiment, the insulating film may be a continuous film, free of pores. According to one embodiment, the insulating film can be a film impermeable to water, and/or a film of plastic material, and/or a composite film comprising a layer of plastic material, and/or a composite film comprising a layer made of a material impermeable to water.

According to one embodiment, the insulating film can have a resistance to hydrostatic pressure of at least 5000 mm of water, preferably of at least 10,000 mm of water, preferably of at least 15,000 mm of water, and very preferentially of at least 20,000 mm of water. It is possible to institute a test based on the ISO811 standard, which consists of applying to the film a water column of increasingly large height. The test stops when water passes through the film.

According to one embodiment, the insulating film has a density comprised within a range of values from 1.10 g/cm$^3$ to 1.30 g/cm$^3$. The insulating film may be provided sufficiently supple and/or flexible to adapt to the complex shapes of the rim, in order to be able to be deposited or sheathed on the rim without forming folds visible to the user of the vehicle steering wheel.

According to one embodiment, the insulating film and the electrical device may form a stratified structure, preferably before the electrical device is assembled on the steering wheel. In other words, the insulating film and the electrical device may form a single component to be deposited on the rim.

According to one embodiment, the insulating film can be attached to the electrical device and/or to the core by an adhesive. The assembly can be robust.

According to one embodiment, the insulating film can be attached to the core by an aqueous-based glue.

Generally, the glue is a liquid or pasty glue, and/or a glue with at least one liquid part which evaporates during a drying step. According to one embodiment, the glue is an aqueous-based glue. According to an alternative, the glue is a solvent-based glue, or an adhesive with a solvent or organic solvent. In other words, during the application of the glue, a liquid part (water or organic solvent) of the glue can migrate into porous materials, and/or disrupt the operation of the electrical device. The insulating film can serve as a barrier impermeable to the liquid part to prevent it from migrating into porous materials, and/or to disturb the operation of the electrical device.

According to one embodiment, the insulating film can be separated from the core only by an adhesive. The structure can remain simple and does not require other intermediate components to avoid malfunctions (short-circuits or measurement disturbances).

According to one embodiment, the steering wheel may comprise a second overmolding material at least partially overmolded on the electrical device. In other words, provision may be made for at least partially embedding the electrical device with a second overmolding material. In this case, the minimum thickness of the first overmolding material may be small and the risk of proximity between the frame and an outer surface of the core is great.

According to one embodiment, the electrical device may form a heating device and/or a device for detecting contact or proximity of a user with the steering wheel.

According to one embodiment, the substrate of the electrical device may be a foam, with a density that may be comprised in a range of values ranging from 0.10 g/cm$^3$ to 0.80 g/cm$^3$. Such a substrate may be provided to be sufficiently supple and/or flexible to adapt to the complex shapes of the rim, in order to be able to be deposited or sheathed on the rim without forming folds visible to the user of the vehicle steering wheel. The electrical device may be a sheath at least partially covering the core. The substrate may have the shape of a supple, flexible sheet or plate to cover all or part of the core.

According to one embodiment, the substrate of the electrical device can be formed of polyethylene (PE), or of polyurethane (PU), or of ethylene-propylene-diene monomer (EPDM), or of poly(vinyl chloride) (PVC). Such a substrate may be provided to be sufficiently supple and/or flexible to adapt to the complex shapes of the rim, in order to be able to be deposited or sheathed on the rim without forming folds visible to the user of the vehicle steering wheel.

According to one embodiment, the substrate of the electrical device may comprise polyethylene PE, and/or polyurethane PU, and/or ethylene-propylene-diene monomer EPDM monomer, and/or polyvinyl chloride PVC. Such a substrate may be provided to be sufficiently supple and/or flexible to adapt to the complex shapes of the rim, in order to be able to be deposited or sheathed on the rim without forming folds visible to the user.

According to one embodiment, the substrate of the electrical device may have a thickness greater than 500 μm. Such a substrate may be provided to be sufficiently supple and/or flexible to adapt to the complex shapes of the rim, in order to be able to be deposited or sheathed on the rim without forming folds visible to the user of the vehicle steering wheel.

According to an embodiment, the substrate of the electrical device may be formed by an open-cell foam. Such a substrate may be provided to be sufficiently supple and/or flexible to adapt to the complex shapes of the rim, in order to be able to be deposited or sheathed on the rim without forming folds visible to the user of the vehicle steering wheel.

Another aspect of the invention relates to a vehicle comprising a vehicle steering wheel according to the first aspect.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which:

FIG. 1 shows a front view of a vehicle steering wheel;

FIG. 2 depicts a cross-section view of a rim of the vehicle steering wheel of FIG. 1;

FIG. 3 depicts another cross-section view of the rim of the vehicle steering wheel of FIG. 1;

FIG. 4 shows a schematic view of an electrical device of the rim of the vehicle steering wheel of FIG. 1.

DETAILED DESCRIPTION OF THE EMBODIMENT(S)

FIG. 1 shows a vehicle steering wheel with a rim 10, a hub 30 and branches 20 connecting the rim 10 to the hub 30. The rim 10 provides a manipulation interface to a user who can grip it by hand to drive the vehicle. To improve comfort and/or propose driving assistance options, the rim 10 can be equipped or sheathed with one or more electrical devices (device for heating and/or detecting contact or proximity with the user).

To perform these functions, the electrical device can be placed under the external surface of the rim 10. As shown in the schematic section of FIG. 2, along the straight line II-II of FIG. 1, the rim 10 in particular comprises:
a frame 11,
an overmolding material 12,
an electrical device 14,
an outer sheath 15.

The frame 11 is typically a metal part forming a framework of the vehicle steering wheel. It is possible to provide an injected metal part, for example magnesium. The overmolding material 12 makes it possible to line the framework 11, and may be a plastic, a polymer, a foam, a polyurethane foam, for example. The frame 11 and the overmolding material 12 thus form a core N of the rim 10.

The electrical device 14 is schematically shown in FIG. 4 and can comprise a substrate 141 (a flexible sheet, such as a plastic material, a polymer, a foam, an open-cell foam, for example, etc.) on which an electrical conductor 142 can be provided, or a plurality of electrical conductors (one or more metal wire(s) sewn, a deposition of a conductive material, a fabric or a conductive nonwoven textile, etc.). FIG. 4 shows an insulating film 13 whose function will be explained below.

Finally, the outer sheath 15 covers the whole to provide an attractive appearance. It is possible to provide a sheath made of natural or synthetic leather or any other covering material. The outer sheath 15 can be sewn with a seam 16.

FIG. 2 shows a cross-section of the rim 10 along the straight line II-II of FIG. 1, and FIG. 3 shows another section of the rim 10 along the straight line III-III of FIG. 1. FIG. 3 shows the same elements as FIG. 2, but as shown in FIG. 3, the frame 11 can have a different shape, and can be located closer to one of the outer surface of the overmolding material 12.

As regards the electrical device 14, provision may be made for the electrical conductor 142 of the electrical device 14 to be at least partly on the surface of the substrate 141 and facing the core N of the rim 10. In the context of FIG. 3, the proximity of the frame 11 can pose a problem and cause a short-circuit or a disruption of the operation in the frame, for example of a contact or proximity sensor (typically capacitive).

In order to prevent any risk, an insulating film 13 is provided between the electrical device 14 and the core N of the rim 10, i.e. the insulating film 13 is provided between the electrical device 14 and the overmolding material 12 and/or the frame 11. Thus, electrical insulation is provided by the insulating film 13, and/or a minimum distance (the thickness of the insulating film 13) is maintained between the electrical device 14 and the overmolding material 12 and/or the frame 11.

In detail, the insulating film 13 can be provided to be sufficiently flexible and deformable to adapt to the complex shapes of the steering wheel. To this end, provision may be made to form the insulating film 13 of polyethylene (PE), or of polyurethane (PU), or of ethylene-propylene-diene monomer (EPDM), or of poly(vinyl chloride) (PVC), or of thermoplastic polyurethane (TPU). Thermoplastic polyurethane (TPU) may be preferred. The insulating film 13 has a thickness of less than 200 μm, preferentially between 10 μm and 100 μm, ideally between 10 μm and 50 μm. The insulating film may have a density comprised within a range of values from 1.10 g/cm$^3$ to 1.30 g/cm$^3$.

It is provided to attach the insulating film 13 onto the electrical device 14 by an adhesive element of any nature (a thin layer of glue used on the adhesive strips and previously deposited on one of the components in question, or a double-sided adhesive tape which can be deposited manually or in an automated manner, or a glue spread on either the insulating film 13 and/or the electrical device 14, etc.) to obtain a laminate to be deposited directly on the core N of the rim 10. In this case, it is also possible to provide an adhesive element of any nature (a thin layer of glue used on the adhesive strips and previously deposited on one of the components in question, or a double-sided adhesive tape which can be deposited manually or in an automated manner, or a glue spread on either the insulating film 13 and/or the core N of the rim, etc.). According to this configuration, the insulating film 13 and the electrical device 14 are deposited in a single operation on the core N of the rim 10.

Alternatively, it is provided to attach the insulating film 13 to the core N and then the electrical device 14. For each operation, it is possible to use an adhesive element of any nature (a thin layer of glue used on the adhesive strips and previously deposited on one of the components in question, or a double-sided adhesive tape which can be deposited manually or in an automated manner, or a glue spread on one of the components to be assembled). According to this configuration, the insulating film 13 and the electrical device 14 are deposited in two successive operations on the core N of the rim 10.

In summary, to assemble the steering wheel, two methods can be provided with regard to the sheathing of the rim 10. In a single sheathing method, the electrical device 14 and the outer sheath 15 are assembled together beforehand and then placed in a single step on the rim 10. In a double sheathing method, the electrical device 14 and the outer sheath 15 are assembled successively in two steps on the rim 10. In any case, the insulating film is interposed between the core and the electrical device and in particular between the core and the electrical conductor of the electrical device.

INDUSTRIAL APPLICATION

A vehicle steering wheel according to the present invention, and its manufacture, are capable of industrial application.

It will be understood that various modifications and/or improvements which are obvious for the person skilled in the art may be made to the different embodiments of the invention described in the present description, without departing from the scope of the invention.

The invention claimed is:

1. A vehicle steering wheel, comprising:
a hub arranged to be connected to a steering element of the vehicle,
at least one branch attached to the hub,
a rim attached to said at least one branch, and comprising:
a core defined by a frame portion and by an overmolding material at least partially overmolded on an exterior surface of the frame portion,
an electrical device covering at least part of the core and comprising a substrate supporting at least one electrical conductor arranged facing the core,
wherein the steering wheel comprises an insulating film electrically arranged between the electrical conductor and the core, and
wherein the insulating film is applied directly to the overmolding material such that at least a portion of the overmolding material is positioned between the exterior surface of the frame portion and the insulating film and such that the insulating film covers and contacts the overmolding material at least substantially over an entire periphery of the overmolding material.

2. The vehicle steering wheel according to claim 1, wherein the insulating film has a thickness of less than 200 μm.

3. The vehicle steering wheel according to claim 1, wherein the insulating film comprises polyethylene (PE), and/or polyurethane (PU), and/or polymer of ethylene-propylene-diene monomer (EPDM), and/or polyvinyl chloride (PVC), and/or thermoplastic polyurethane (TPU).

4. The vehicle steering wheel according to claim 1, wherein the insulating film has a density comprised within a range of values from 1.10 g/cm$^3$ to 1.30 g/cm$^3$.

5. The vehicle steering wheel according to claim 1, wherein the insulating film and the electrical device form a laminated structure.

6. The vehicle steering wheel according to claim 1, wherein the insulating film is attached to the electrical device and/or to the core by means of an adhesive.

7. The vehicle steering wheel according to claim 6, wherein the insulating film is attached to the core with a water-based adhesive.

8. The vehicle steering wheel according to claim 1, wherein the insulating film is separated from the core only by an adhesive.

9. The vehicle steering wheel according to claim 1, wherein the electrical device forms a heating device and/or a device for detecting contact or proximity of a user with the steering wheel.

10. The vehicle steering wheel according to claim 1, wherein the substrate of the electrical device is a foam, with a density comprised within a range of values from 0.10 g/cm$^3$ to 0.80 g/cm$^3$.

11. The vehicle steering wheel according to claim 1, wherein the substrate of the electrical device comprises polyethylene (PE), and/or polyurethane (PU), and/or polymer of ethylene-propylene-diene monomer (EPDM), and/or polyvinyl chloride (PVC).

12. The vehicle steering wheel according to claim 1, wherein the substrate of the electrical device has a thickness greater than 500 μm.

13. The vehicle steering wheel according to claim 1, wherein the substrate of the electrical device is made of an open-cell foam.

14. A vehicle comprising a vehicle steering wheel according to claim 1.

15. The vehicle steering wheel according to claim 1, wherein the overmolding material is only contained within the insulating film.

16. The vehicle steering wheel according to claim 1, wherein the exterior surface of the frame portion faces outward towards an exterior surface of the vehicle steering wheel.

17. The vehicle steering wheel according to claim 16, wherein the frame portion further comprises an inner surface facing towards a center of the vehicle steering wheel.

18. The vehicle steering wheel according to claim 17, wherein the exterior surface of the frame portion is wholly covered by the overmolding material.

19. The vehicle steering wheel according to claim 1, wherein the insulating film is at least substantially spaced apart from the frame portion.

20. The vehicle steering wheel according to claim 19, wherein the insulating film is entirely spaced apart from the frame portion.

* * * * *